United States Patent [19]

Andersen

[11] Patent Number: 4,718,062
[45] Date of Patent: Jan. 5, 1988

[54] TELECOMMUNICATION SYSTEM FOR ALTERNATINGLY TRANSMITTING CIRCUIT-SWITCHED AND PACKET-SWITCHED INFORMATION

[75] Inventor: Ib N. Andersen, Trångsund, Sweden

[73] Assignee: Telefonaktiebolaget L M Ericsson, Stockholm, Sweden

[21] Appl. No.: 857,057

[22] Filed: Apr. 29, 1986

[30] Foreign Application Priority Data

Apr. 30, 1985 [SE] Sweden ................................. 8502115

[51] Int. Cl.$^4$ ................................................. H04J 3/24
[52] U.S. Cl. ........................................................ 370/94
[58] Field of Search .................. 370/60, 94, 79, 80, 370/58

[56] References Cited

U.S. PATENT DOCUMENTS

| | | | |
|---|---|---|---|
| 3,564,144 | 2/1971 | Diggelmann et al. | 370/80 |
| 3,988,545 | 10/1976 | Kuemmerle et al. | 370/60 |
| 4,238,851 | 12/1980 | Takahashi et al. | |
| 4,408,323 | 10/1983 | Montgomery | 370/60 |

Primary Examiner—Robert L. Griffin
Assistant Examiner—Wellington Chin
Attorney, Agent, or Firm—Burns, Doane, Swecker & Mathis

[57] ABSTRACT

The invention relates to a telecommunication system in which alternatingly circuit-switeched and packet-switched information is transmitted in time-divided form between transmitter and receiver equipments.

A system is described for multiplexing telephony channels with static and dynamic capacity. A static channel occupies a time slot in a fixed frame structure. The dynamic channels utilize idle time slots. A status bit per time slot states whether the time slot is occupied or not. According to the invention, equipment for transmitting circuit-switched information is combined with equipment for transmitting packet-switched information, such that a hybrid system is obtained which, under the control of a status bit, alternatingly transfers information from the respective equipment in response to the polarity of the status bit.

A circuit-switching memory (CS) is continuously scanned in a multiplexer (DS1). Data words are stored in the memory, each word corresponding to a time slot, which in turn corresponds to an information channel in a TDM system. A status bit of the mentioned kind is inserted in each data word.

For an occupied time slot in the memory CS the word from the memory CS is transmitted to a circuit-switching receiver (CR) via a line (L) and a demultiplexer DS2.

For an idle time slot in the memory CS sends the word which is first in the queue in a buffer memory PS included in a packet-switching connection and is transmitted to a packet-switching receiver PR via the line L.

6 Claims, 4 Drawing Figures

TELECOMMUNICATION SYSTEM FOR ALTERNATINGLY TRANSMITTING CIRCUIT-SWITCHED AND PACKET-SWITCHED INFORMATION

TECHNICAL FIELD

The invention relates to a telecommunication system in which cicuit-switched and packet-switched information is alternatingly transmitted, in time-divided form, between transmitting equipment and receiving equipment.

BACKGROUND ART

It is known, inter alia from CCITT recommendation X51, always to address a time slot content with a time slot number in a time-divided system, and that a status bit in the frame format states whether the content is transparent user data or network signalling.

DISCLOSURE OF INVENTION

A problem with the known principle is that a technically relatively complicated system with comparatively low capacity utilization is obtained.

The system in accordance with the invention, which solves the above-mentioned problem, is characterized by the claims and includes an apparatus for multiplexing telephony channels with static and dynamic capacity. A static channel occupies a time slot in a fixed frame structure. The dynamic channels utilize unoccupied time slots. A status bit per time slot denotes whether the slot is occupied or not. The above-mentioned problems are solved by a memory unit CS (Circuit Switch) in a transmitter for circuit switching being continuously scanned in an apparatus for alternatingly transmitting circuit-switched and packet-switched information, and that the memory contains information corresponding to a number of time slots, in their turn corresponding to a number of information channels in a TDM-system. Each time slot is assigned with the aid of a time slot number, and in every memory position corresponding to a time slot there is written a data word. A status bit is inserted in the data word, which comprises a plurality of bits, this status bit having a polarity which on scanning denotes whether an assigned channel is occupied or not. If the channel is occupied, i.e. the status bit has a given polarity, e.g. a logical One, the information is sent out on the line to a receiver from said circuit-switching transmitter. On the other hand, if the time slot is idle, which is apparent from the status bit having the reversed polarity, in this case a logical Zero, the information is instead sent out over the line to the receiver from a buffer memory PS (Packet Switch) in a transmitter for packet-switching. The circuit-switching memory CS has priority over the packet switching memory PS, the latter memory only being allowed to send when an idle time slot is detected on scanning the memory CS. The right to send falls directly therafter to the circuit-switching memory CS. The memory PS sends a segment which is equally as great as the time slot excluding the status bit.

The advantage with the apparatus in accordance with the invention is thus that a technically simple and uncomplicated solution is obtained, while utilizing a minimum of hardware, enabling unoccupied time slots to be utilized for dispatching packet information which is queing in the packet-switching buffer PS. This thus gives a more efficient utilization of system capacity than there is in the prior art, where the respective memory must be scanned in turn with accompanying time delay.

BRIEF DESCRIPTION OF DRAWINGS

The apparatus in accordance with the invention will now be described in detail with the aid of an embodiment and with reference to the accompanying drawing, on which

BEST MODE FOR CARRYING OUT THE INVENTION

Figure 1:
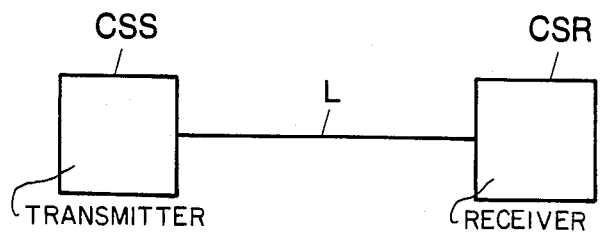
FIG. 1 is a simple sketch of a conventional static TDM system

The principle for multiplexing in a static TDM system of a known kind is illustrated in FIG. 1.

A transmitter CSS sends data on several channels via a link L to a receiver CSR in the following manner. A synchronizing pattern defines the existence of a frame in the bit stream. The frame is divided into a number of time slots, one time slot per channel. Each time slot contains a plurality of bits. The receiver detects the frame synchronization and by reading the time slot number can subsequently see to which channel the time slot is associated. Each time slot transmits a given number of bits per second and thus constitutes a channel with static capacity. This multiplexing form is used in systems of the circuit switching type.

Figure 2:
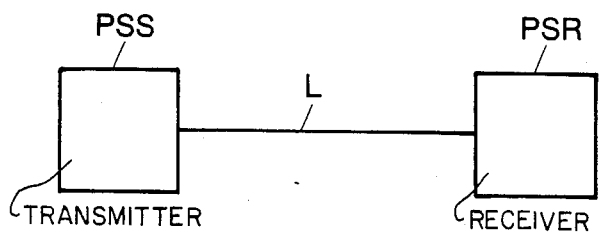
FIG. 2 is a simple sketch of a conventional dynamic TDM system

The principle for multiplexing in a dynamic TDM system of a known kind is illustrated in FIG. 2.

A transmitter PSS sends data associated with a given channel through a link L to a receiver PSR. This data is included in a frame which also includes an address field. A frame delimiting mechanism enables the receiver to recognize the frame in the received bit stream, and the address field gives the channel in question. The transmitter only sends on one channel at a time when there is the need and possibility. Each channel thus occupies a varying part of the link capacity.

Some known frame delimiting mechanisms are the START/STOP bit and the HDLC-flag.

The address field may state sender or receiver (HDLC) or logical channel number (X.25 lag 3).

This multiplexing form is used in packet-switching systems.

Figure 3:
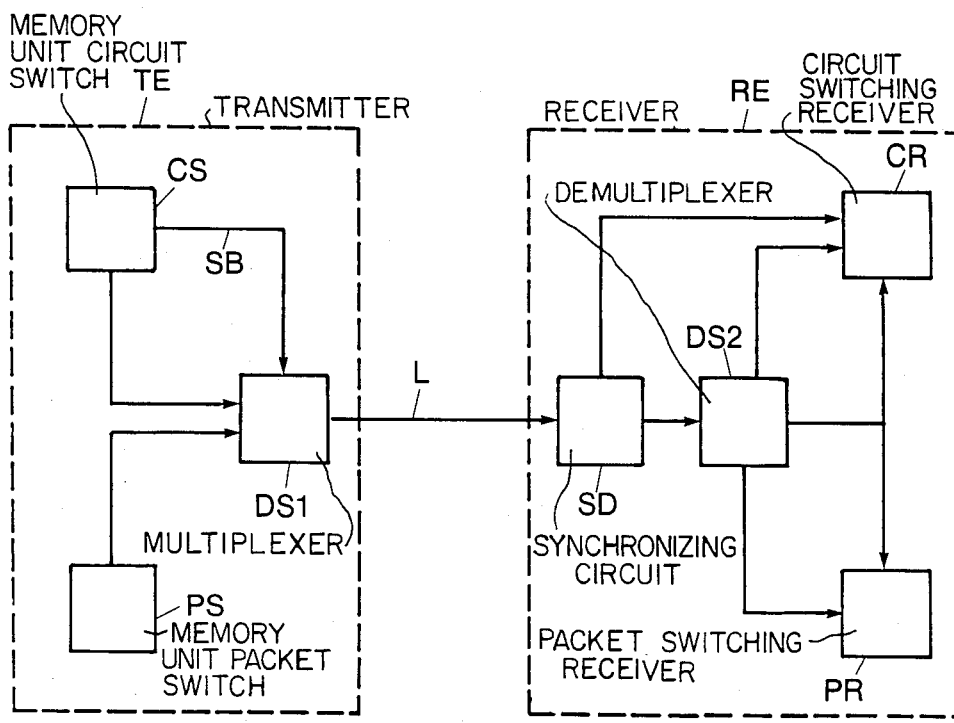

In the inventive apparatus, equipment for transmitting circuit-switched information (speech) is combined with equipment for transmitting packet-switched information (data) such that under the control of a status bit a hybrid system is obtained, which alternatingly transmits information from the respective equipment in response to the polarity of the status bit. FIG. 3 is a block diagram of such a system.

A transmitter TE and a receiver RE each contain a CS (Circuit Switch)-part and a PS (Packet Switch) part. The CS part of the transmitter differs from the known CS transmitter (FIG. 1) by its having a marking on each CS channel which tells whether the channel is occupied or idle. The CS transmitter sends this marking in each time slot in the form of a status bit SB to a hybrid multiplexer DS1. If the marking denotes that the time slot is occupied the multiplexer DS1 selects a sample (word)

from the corresponding CS channel. On the other hand, if the marking states that the time slot is idle, the multiplexer selects a sample from the PS transmitter which sample having the same number of bits as the one sent by the CB channel. The hybrid multiplexer DS1 sends data on a link L in a time slot divided frame structure. Each time slot occuring on the link thus contains, apart from conventional bits, a status bit SB stating whether the time slot contains a sample from the CS transmitter or the PS transmitter. The receiver RE detects frame synchronization and time slot number in a synchronizing circuit SD of a known kind, and examines the status bit polarity in a detector logic MD (see FIG. 4) to determine whether the time slot content shall be directed to a circuit-switching receiver CR or to a packet-switching receiver PR. A hybrid demultiplexer DS2 switches the information in the time slot further to the receiver CR or to the receiver PR, depending on the state of the status bit. The receiver PR puts together received PS samples (words) to a bit stream which carries frames with addresses as with a dynamic TDM system.

Figure 4:
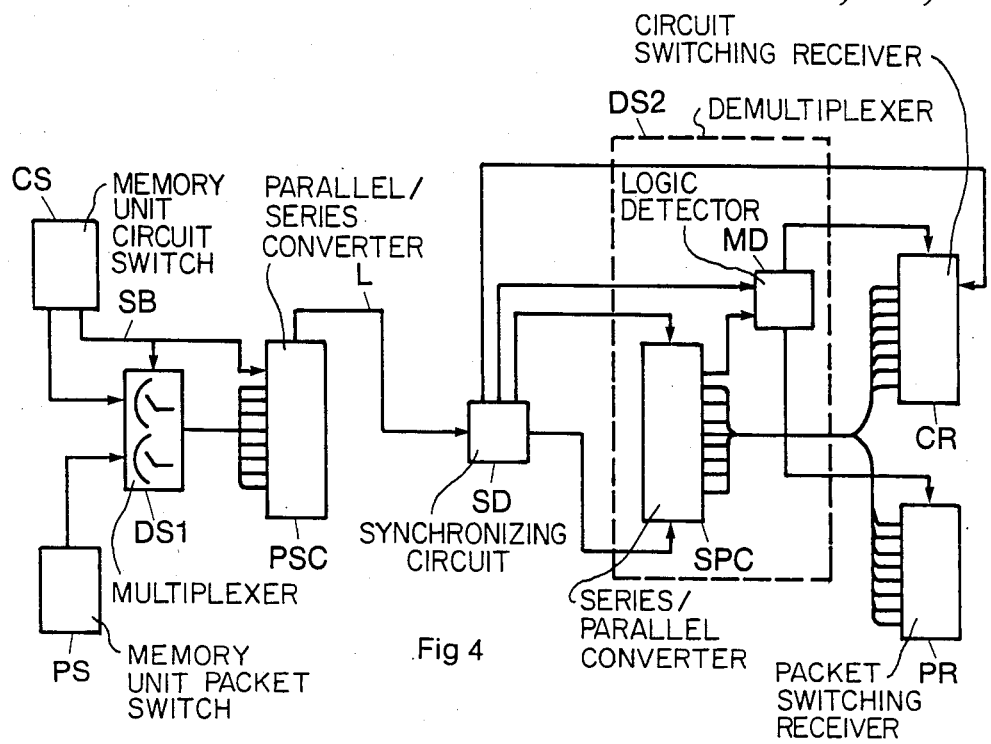
FIG. 3 is a block diagram of a system including the apparatus in accordance with the invention and FIG. 4 illustrates an embodiment of the system according to FIG. 3.

In agreement with the overall FIG. 3 there is illustrated in FIG. 4, in a block diagram, an example of the implementation of a hybrid multiplexer/demultiplexer in accordance with the invention. There is further described a sequence for information transmission in accordance with the invention. No account is given for writing into and reading from the memories, since this is known to the art, neither are the clock signals shown, which conventionally control the functions of the different units.

The speech transmitter, i.e. the circuit-switching transmitter, is symbolized in FIG. 4 by a RAM memory CS of the type INTEL 2148, in which one word per time slot can be stored, where each time slot corresponds to a channel. The memory CS is pointed out sequentially in a known way by means of time slot numbers. Each word contains a speech sample as well as a status bit which shows whether the channel corresponding to the assigned time slot is idle or occupied. This status bit is supplied to a control input on a multiplexer in the form of a data selector DS1 of type 74LS157, the data inputs of which connected to the data outputs of the memory CS. To further data inputs on the selector DS1 there are connected data outputs from a buffer memory PS, which is a FIFO buffer of the type MONOLITHIC MEMORIES C67401 for storing packet-switched data words in a queue. The data selector DS1 has the task of controlling the CS/PS switching, i.e. alternation between circuit and packet information, in response to the polarity of the controlling status bit SB. Speech information has priority. For an idle time slot i the circuit memory CS there will be switching to the packet buffer PS, which then sends the first segment in the queue out to the line during the idle time slot. When the buffer PS does not have any new information to send in the idle time slot the latest read-out word is transmitted once again, according to this example. The selected data words are sent from the data outputs on the selector DS1 in parallel form to the input on a parallel/series converter PSC. One of these inputs receives the status bit from the memory CS. The converter PSC, of the type 74166, converts the received bits to series form and sends them further via a line L to a synchronizing circuit SD on the receiver side. Frame synchronization is obtained conventionally, according to the example, by the word 0 i the memory CS always contains a bit pattern kown to the receiver. The synchronizing circuit detects the time slot number, time slot rate and bit rate in the time slot. The bit rate controls a series/parallel converter SPC of the type 74LS164 in the demultiplexer DS2, this converter receiving the bit stream from the synchronizing circuit SD and converts this series bit stream to parallel signals. The time slot number gives the receiver information as to the channel in question. The time slot rate controls transmission of data information from the series/parallel converter SPC to the receivers CR and PR. The status bit received in the series/parallel converter SPC and sent from the transmitter side is sent further from the converter to a detector logic MD which also receives the time slot rate from the synchronizing circuit SD. The status bit thus controls the output from the demultiplexer. In response to the status bit polarity, the information is either directed to a receiver CR for circuit-switched information, or to a receiver PR for packet-switched information. The components selected in the example and illustrated in FIG. 4 are drawn on the figure as individual units, but naturally may consist of further similar components for each individual function, if this is necessary for reasons of capacity. In the example according to FIG. 4 the line L comprises a wire which transfers data in series form. However, it may comprise several wires of transmitting data in parallel form. Further according to the example, the CS/PS selector DS1 selects "PS" (packet switch) when "CS" (circuit switch) is idle, irrespective of whether "PS" has any need or, not, i.e. irrespective of whether there is any word queuing in the buffer "PS" or not. Further according to the example there is the possibility of utilizing another solution which selects "CS" when neither "CS" nor "PS" have any need. According to the example, one status bit is transmitted per time slot. A CS/PS indication can however be transmitted in other ways e.g.

(a) by several status bits per time slot
(b) an other property in the time slot, e.g.
  even parity="CS"
  odd parity="PS"
(c) general coding. The time slot contains n bits. The $2^n$ bit patterns are divided into p PS code words and c CS code words so that $p+c=2^n$. The CS/PS multiplexer DS1 depicts PS and CS samples on the respective PS and CS code words. The CS/PS demultiplexer DS2 makes the reverse depiction and sends the decoded sample to the PS and CS receiver.

I claim:
1. A telecommunication system in which circuit-switched and packet-switched information is transmitted, comprising:
   (a) transmitting equipment including
      a first memory having channels corresponding to respective time slots, each channel containing status information indicating whether that channel is in an occupied state or an idle state,
      a second memory,
      a multiplexing means sequentially scanning the channels in said first memory during respective time slots and being responsive to the status information in each channel to retrieve data from said first memory during a time slot when the status information indicates that a channel is occupied and to retrieve data from said second memory during a time slot when the status information indicates that a channel is idle, and a parallel to serial converter for receiving and converting data retrieved by said multiplexing means;

(b) receiving equipment including detection means for detecting data and synchronizing information from said transmitting equipment, a demultiplexer including a serial to parallel converter for receiving information detected by said detecting means and converting the received information to parallel data, a first receiver, a second receiver, and detector logic responsive to status information in data received from said transmitting equipment for sending information from said demultiplexer to one of said first and second receivers; and (c) a transmission line connecting said transmitting equipment to said receiving equipment.

2. Telecommunication system according to claim 1, wherein said status information comprises a status bit written into a given memory position in each channel in said first memory, the polarity of said status bit indicating said occupied state or said idle state.

3. Telecommunication system according to claim 1, wherein said memory channels include data/address information, and status bit information.

4. Telecommunication system according to claim 1, wherein said first memory and said first receiver are included in a connection for circuit-switching.

5. Telecommunication system according to claim 1, wherein said second memory and said second receiver are included in a connection for packet-switching.

6. Telecommunication system according to claim 1, wherein information from said first memory has priority over information from said second memory, so that the transmitting right is returned to said first memory after the transmission of information in a given time slot from said second memory has terminated.

* * * * *